E. SCHNEIDER.
TRACTOR HAVING TWO PAIRS OF DRIVING WHEELS.
APPLICATION FILED MAR. 26, 1921.

1,391,011.

Patented Sept. 20, 1921.
2 SHEETS—SHEET 1.

E. SCHNEIDER.
TRACTOR HAVING TWO PAIRS OF DRIVING WHEELS.
APPLICATION FILED MAR. 26, 1921.

1,391,011.

Patented Sept. 20, 1921.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

TRACTOR HAVING TWO PAIRS OF DRIVING-WHEELS.

1,391,011.  Specification of Letters Patent.  Patented Sept. 20, 1921.

Application filed March 26, 1921. Serial No. 455,948.

*To all whom it may concern:*

Be it known that I, EUGÈNE SCHNEIDER, citizen of the Republic of France, resident of Paris, France, have invented new and useful Improvements in Tractors Having Two Pairs of Driving-Wheels, (for which I have filed an application in France, Jan. 30, 1920,) which invention is fully set forth in the following specification.

This invention has for its object to provide an improved tractor having two pairs of driving wheels comprising two single axle trucks, pivotally connected to each other, the front truck carrying the whole of the motor mechanism, whereas the rear truck carries the gear for transmitting the motion to the rear road wheels, and the steering gear that acts by controlling the pivotal direction of the rear truck relatively to the front truck.

The invention is characterized by a kinematic apparatus that allows of obtaining great rigidity of the vehicle in the vertical sense, with at the same time an easy mode of suspension for the axles, and a mechanism that allows of one of the trucks to turn relatively to the other around a horizontal axis for the purpose of enabling the road wheels to adapt themselves to uneven ground.

The invention is illustrated in the accompanying drawings in which:—

Figure 1:
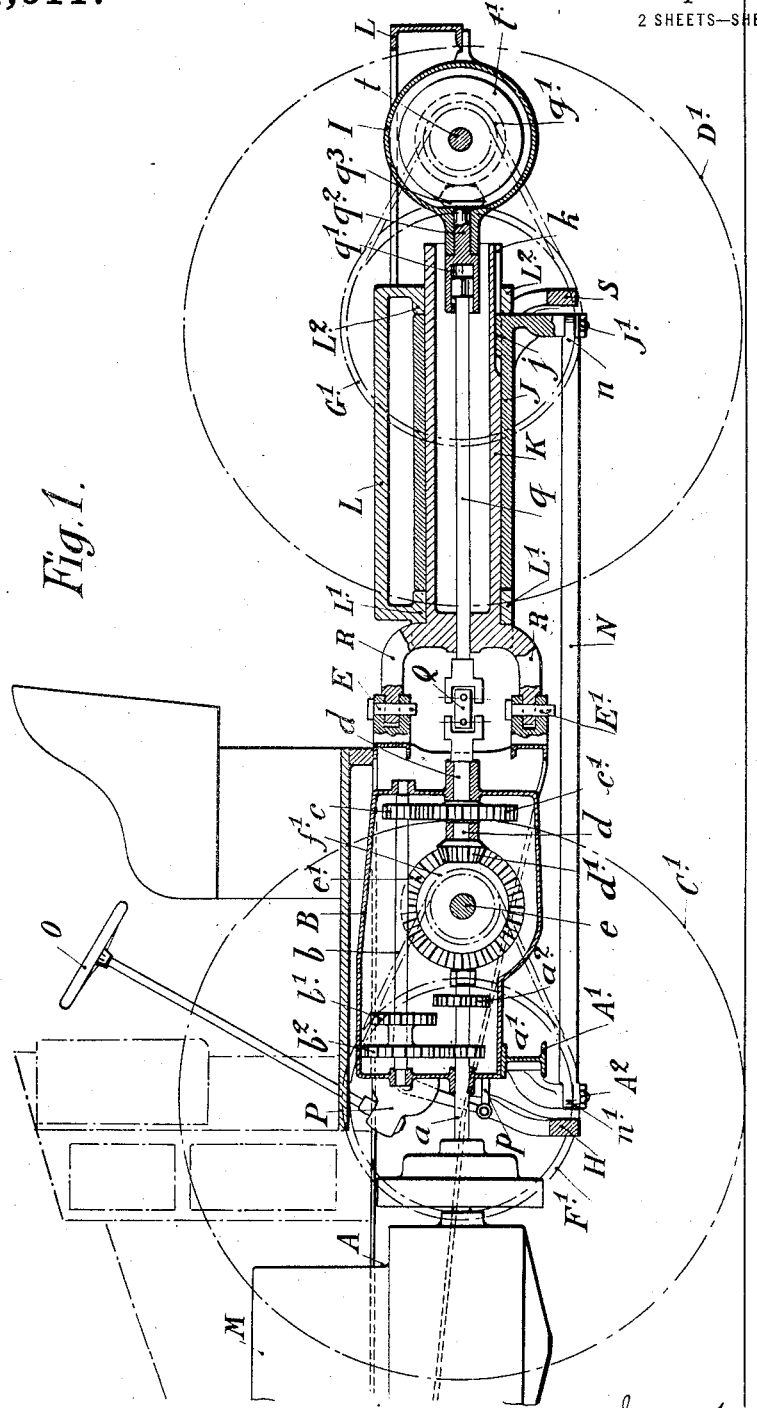
Figure 1 is a longitudinal elevation partly in section.

The front truck frame A carries on one hand the engine M and on the other hand a mechanism inclosed in a casing B. This mechanism comprises:—a main shaft $a$; an auxiliary shaft $b$, with change-speed gear $a^1$ $a^2$—$a^3$, $b^2$; and a reducing gear $c$ $c^1$ whose toothed wheel $c^1$ is mounted on a shaft $d$ that carries a pinion $d^1$ driving through a pinion $e^1$ a cross shaft $e$ carrying a differential and also, for example, members such as chain pinions $f$ and $f^1$ that drive by means of chains the chain wheels F and $F^1$ which are fixed to the two front driving road wheels C $C^1$ respectively.

These driving road wheels are mounted on the axle H upon which the truck frame A rests through the medium of springs $h$, $h^1$. This axle H is suitably bent to provide space for the mechanism.

At the rear of the front truck there are hinged by pivot pins E, $E^1$ which are arranged along a common vertical axis, the prongs of a fork R that is continued rearwardly in the form of a tubular extension K.

Upon this tubular extension is journaled by means of two bearings $L^1$ and $L^2$, the rear truck frame L which is mounted through the medium of springs $u$, $u^1$ upon the axle S that carries the rear driving road wheels D, $D^1$.

The vertical pivot E $E^1$ allows the rear truck to turn in a horizontal plane relatively to the front truck for steering purposes, while the journaling of the rear truck frame upon the tubular extension K allow the road wheels of both trucks to adapt themselves to uneven ground.

On the tubular extension K there is slidably mounted a sleeve J held between the bearings $L^1$ and $L^2$ of the truck frame L and which is provided with a key $j$ adapted to slide in a longitudinal groove $k$ in the tubular extension K. On the underside of the sleeve J there is formed or fitted a projecting pin $J^1$ for one end $n$ of a tie-rod N engaged at its other end $n^1$ on a pin $A^2$ fixed to a cross member $A^1$ of the front truck frame A.

The pivot joints $n$ and $n^1$ are arranged as close as possible to the vertical planes of the spindles of the wheels D, $D^1$ and C, $C^1$. The tie-rod N is designed to maintain a constant distance betwen the geometrical centers of the two axles, during the steering movements of the trucks. As shown in the drawings the axles may be bent in an oblique plane so as to clear the pivot joints $n$ and $n^1$.

Figure 2:
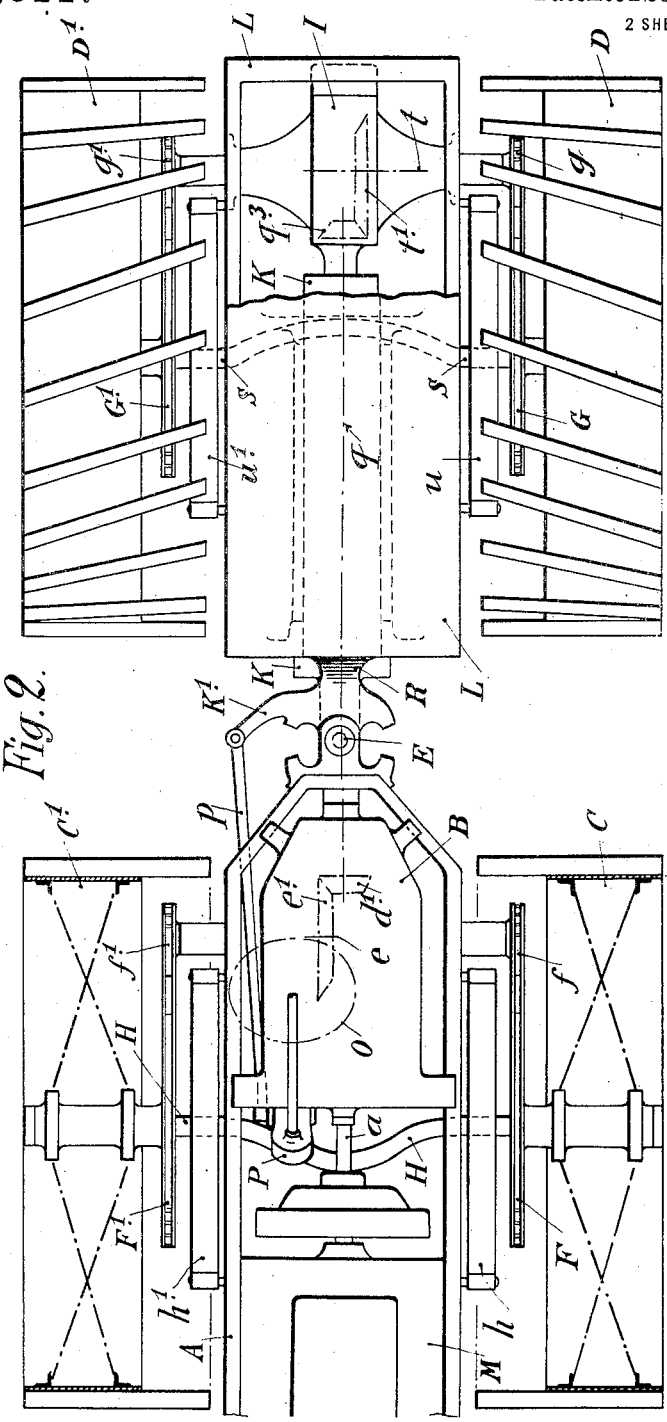
Fig. 2 is a plan thereof.

The combined fork and tubular extension R—K carries laterally a steering arm $K^1$ (Fig. 2) connected by a connecting rod $p$ to a steering gear P operated by means of a hand wheel O.

The rear road wheels are driven by a gear beginning at the movable member $c^1$ of the reducing gear $c$—$c^1$ and comprising at the end of the shaft $d$, a cardan Q which is preferably double and also arranged preferably along the pivotal axis E—$E^1$. This cardan drives a shaft $q$ on the end of which a sleeve $q^1$ is mounted so as to be capable of sliding but not of rotating thereon. This sleeve $q^1$ is fixed to a shaft $q^2$ journaled in a gear case I of the truck frame L. The shaft $q^2$ carries a pinion $q^3$ by which the motion of the shaft $q$ is transmitted to a pinion $t^1$ carried by a cross shaft $t$ provided with a differential and mounted in the gear case I. The shaft $t$ carries on its ends the chain pinions $g$ and $g^1$ that drive through chains the chain wheel G, $G^1$ which are fixed to the road wheels D and $D^1$ respectively. By the operation of the steering gear O, P, $K^1$, the the tubular extension K is caused to turn around the pivot pins E, $E^1$ relatively to the front truck, while it moves the rear truck with it. During this movement, by the operation of the tie rod N and sleeve J resting upon the bearing $L^2$, the combination L—J slides longitudinally along the tubular extension K, and the rear truck moves backward relatively to the joint E—$E^1$ in such a manner that the distance betwen the geometrical centers of the two axles remains unaltered. This condition is absolutely necessary in order to prevent the rear wheels from slipping relatively to the front wheels in traveling around curves, since these pairs of wheels are connected by a gear that compels them to revolve at equal speeds.

It will be observed that the apparatus above described provides for relative movement of the tractor trucks around a vertical axis and a horizontal axis, while the distance between the axles of the trucks is always a constant and therefore the driving connections are always in positive operating relation with the motor and the driving wheels.

It will be also noted that the invention allows of arranging the axes of the chain gears on a level with the axles, and of thus providing always a correct transmission that is compatible with the suspension of the vehicle.

Finally the pivotal arrangement of the rear truck around the horizontal axis of the tubular extension K allows of a great difference of level between the wheels.

Having now particularly described and ascertained the nature of my said invention and in what manner the same is to be performed, I declare that what I claim is:—

1. A tractor comprising a pair of trucks provided with driving wheels, means pivotally and slidably connecting said trucks and providing for relative movement therebetween, and means for maintaining a constant distance between the axles of said trucks on relative movement of the latter.

2. A tractor comprising a pair of trucks provided with driving wheels and connected for relative movement, a motor mounted on one of said trucks and operatively connected with the driving wheels thereof, flexible and slidable driving means operatively connected with said motor and the driving wheels on other of said trucks, and means for maintaining a constant distance between the axles of said trucks on relative movement of the latter.

3. A tractor comprising a pair of trucks provided with driving wheels and connected for relative movement, a member vertically pivoted to one of said trucks, means slidably mounted on said member and connected with the other of said trucks, and a member connected with said first mentioned truck and said means for maintaining a constant distance betwen the axles of said trucks.

4. A tractor comprising a pair of trucks provided with driving wheels and connected for relative movement, a member pivotally connected to said trucks and provided with an extension, a motor mounted on one of said trucks, and flexible and slidable driving means passing through said extension and operatively connected with said motor and the driving wheels on the other of said trucks.

5. A tractor comprising a pair of trucks, a member connecting said trucks and providing for relative turning movement of the trucks around axes at right angles to each other, means slidably mounted on said member and operatively connected with one of said trucks, and a rod operatively connecting the other of said trucks with said means, said rod being adapted to maintain a constant distance between the axles of said trucks.

Dated this 30th day of December, 1920.

In testimony whereof I have signed this specification.

EUGÈNE SCHNEIDER.

Witnesses:
 ANDRÉ MOSTICKER,
 LOUIS GARDET.